H. GREGG.
BOX FOR THE TRANSPORTATION OF EGGS.
APPLICATION FILED JULY 7, 1916.

1,238,662.

Patented Aug. 28, 1917.
2 SHEETS—SHEET 1.

Inventor
Herbert Gregg.
By
Attorney

H. GREGG.
BOX FOR THE TRANSPORTATION OF EGGS.
APPLICATION FILED JULY 7, 1916.

1,238,662.

Patented Aug. 28, 1917.
2 SHEETS—SHEET 2.

Inventor
Herbert Gregg.
By
Attorney

UNITED STATES PATENT OFFICE.

HERBERT GREGG, OF KEW, MELBOURNE, VICTORIA, AUSTRALIA.

BOX FOR THE TRANSPORTATION OF EGGS.

1,238,662.  Specification of Letters Patent. Patented Aug. 28, 1917.

Application filed July 7, 1916. Serial No. 107,991.

*To all whom it may concern:*

Be it known that I, HERBERT GREGG, a subject of the King of Great Britain and Ireland, and a resident of the postal district of Kew, a suburb of the city of Melbourne, in the county of Bourke, State of Victoria, Commonwealth of Australia, (whose post-office address is 60 Fitzwilliam street, in the said postal district of Kew,) have invented certain new and useful Improvements in Boxes for the Transportation of Eggs, of which the following is a specification.

This invention relates to boxes or crates in which eggs and other products are packed for transportation or storage.

In the past many of the boxes used for this purpose have possessed objections, principally among which has been the inconvenience entailed in handling due to weight and size and their inefficiency, inasmuch as in cases where a plurality of trays have been used easy access to each tray could not be had while others permitted of theft. The boxes have generally been provided in fixed sizes therefore when a reduced number of eggs required transportation a larger box than necessary has frequently been used leading to unnecessary outlay in freight and carriage.

The object of this invention is to provide a box which will be light, strong and durable, and prevents theft of the contents. In addition any tray of eggs may be immediately located and can be separated from the remainder without inconvenience. The height of the box is diminished or increased by the subtraction from or addition thereto of tray sections, each of which is complete in itself. A bottom section and a cover section are utilized and these are easily applied or removed. With the invention a box is provided which assures the eggs safe storage during transport and reduces labor in packing and undue freight charges.

Referring to the drawings which form a part of this specification—

Figure 1:
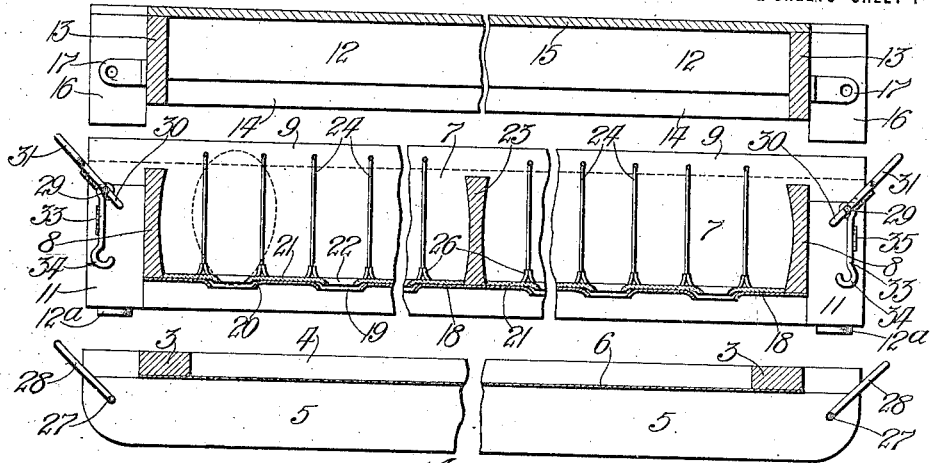
Figure 1 is a longitudinal section of the invention showing a bottom section, a tray section and a cover section separated, and parts broken away for convenience of illustration.

This invention includes a bottom section having side walls 2 and end walls or slats 3. Upstanding above the top of the said side walls and along the inner edges of the said walls is an upstanding lip 4. Attached to the side walls are longitudinal bearers 5. Secured to the walls and bearers or sunk into the same is the bottom 6 of the bottom section.

Above the bottom section is situated a tray section. This includes side walls 7 and end walls 8. It is also provided with an upstanding lip 9 along the top inner edges of each of the side walls. There is likewise an upstanding groove 10 along the bottom inner edges of the side walls which accommodates the upstanding lips 4 of the bottom section. Secured to the ends and sides of the tray section are bearing blocks or cleats 11. These may be provided with rubber or other cushions 12ª. Any number of superimposed tray sections may be used.

Above the tray section or sections is situated a cover section. This also has side walls 12 and end walls 13 and has an upstanding groove 14 along the inner edges of its side walls to accommodate the upstanding lip 9 of the tray section. Above the top of the walls is the cover 15 of the cover section. Secured to the ends and sides of the cover section are bearing blocks or cleats 16. Attached to each end of the cover section is a locking loop 17.

Figure 10:
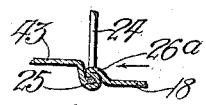
Fig. 10 is an enlarged detail view showing a modified form of attaching a wire egg holder to a tray.
Figure 11:
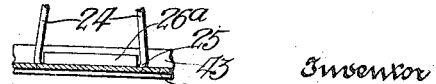
Fig. 11 is a view looking in the direction of the arrow seen in Fig. 10.

In each tray section is a tray 18. This is preferably constructed of sheet metal. In it are a series of egg holes 19, the number of which will depend upon the size of the tray. The edges of the egg holes are turned downwardly forming lips 20. Resting on the tray are a series of cushioning strips 21 made of any suitable soft material. In the cushioning strips are a series of egg holes 22; these are preferably somewhat smaller than the egg holes 19 of the tray thus imparting additional springiness to the edges of the egg holes. Instead of the cushioning strips any other suitable means may be provided to afford a resilient support for the eggs. One or more partitions 23 may separate each tray into compartments. The trays may be fixed to the walls or they may be removable therefrom but are preferably fixed. Attached to the trays and upstanding above the same are a series of wire egg holders 24. Each holder may be constructed from a single length of wire, and each holder is connected by a bridge 25. The lower portions of the holders are attached to the tray by means of tongues 26 uppressed from the tray. The lower ends of the wire holders are placed between the upturned tongues which are then pressed around the wires thereby connecting them to the tray. Instead of being attached as described the holders may be secured to the tray in any other convenient manner, a modified means being shown in Figs. 10 and 11 in which the tray is pressed upwardly to form lips 26ª which are then bent over the bridges 25 of the wire holders.

Pivoted at each end of the bearers 5 of the bottom section previously referred to is a crank wire 27 having cranked portions 28 adjacent each of its ends.

Pivoted in the bearing blocks or cleats 11 at each end of the tray sections are crank wires 29. Each of these is provided near its ends with a cranked portion 30 and an eyelet 31.

Pivoted to the cranked portion of the crank wires are fastening links 33. These are provided at their bottom ends with hooks 34 and are connected by connecting plates 35.

Figure 7:
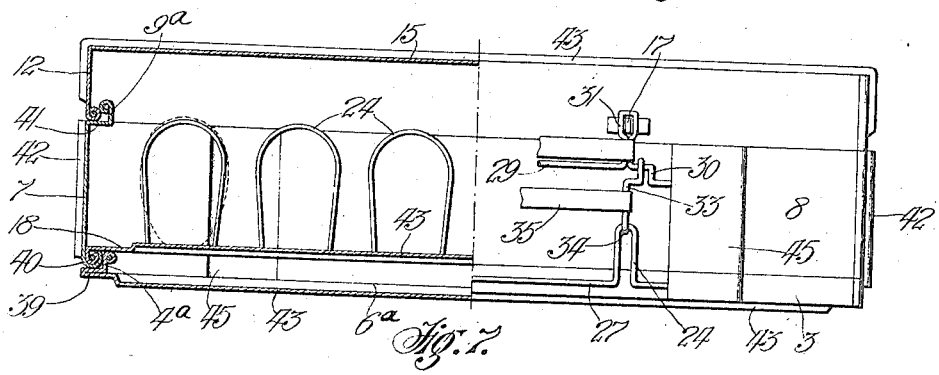
Fig. 7 shows a part sectional end elevation of a box constructed of sheet metal according to this invention.
Figure 8:
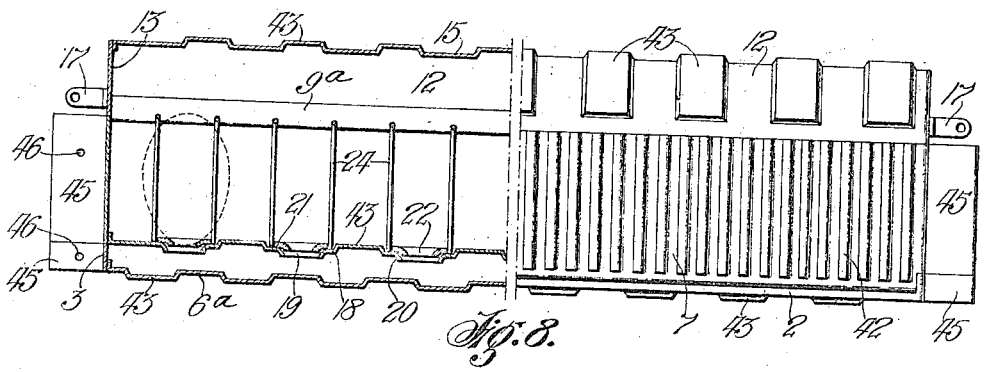
Fig. 8 is a part sectional side or longitudinal view of Fig. 7 portions being removed for convenience.
Figure 9:
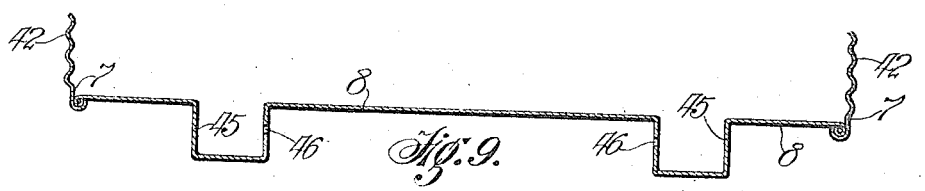
Fig. 9 is a sectional plan of portion of a tray section.

In the construction of the sheet metal box seen in Figs. 7, 8 and 9 the bottom section has its side walls folded back as at 39 and upturned to form the lips 4ª. The sides of the tray section are preferably corrugated as at 42 to afford additional strength and are at their lower edges folded over with the side edges of the tray 18 thus forming a depending lip 40 which engages the upstanding lips 4ª of the bottom section. At their upper edges the sides of the tray section are instepped as at 41 and upturned to form the lip 9ª which is engaged by the sides of the cover section as shown. Stamped out of the tray 18, the base 6ª of the bottom section and the top of the cover section, are lateral reinforcing ridges 43. The ridges of the bottom section are arranged alternately to those of the cover section as seen in Fig. 8 each ridge of the bottom section being in a vertical plane directly between two ridges of the cover section. By this means a number of boxes may be stacked safely on top of each other, the ridges of each bottom section fitting snugly between the ridges of the cover section below. The ridges of the bottom section also serve to strengthen and protect the bottom of the box when resting on the ground. To provide bearings for the crank wires the ends of the bottom and tray sections are provided with expressed portions 45 in which are holes 46 to accommodate the ends of the crank wires.

Figure 2:
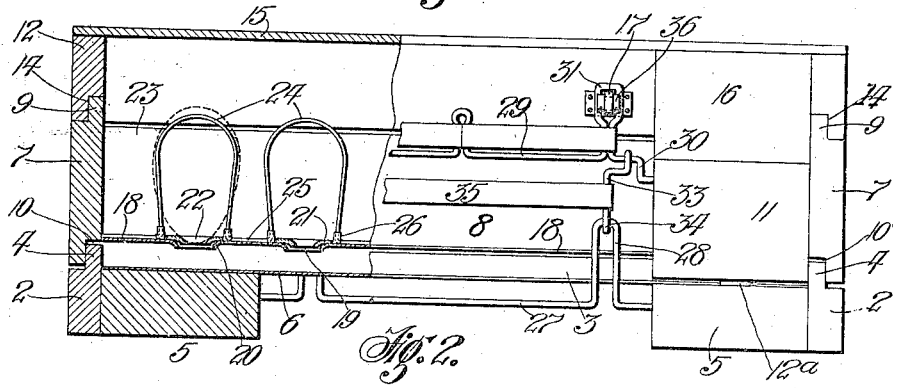
Fig. 2 is a part sectional end view showing the three sections locked together.
Figures 3, 4:
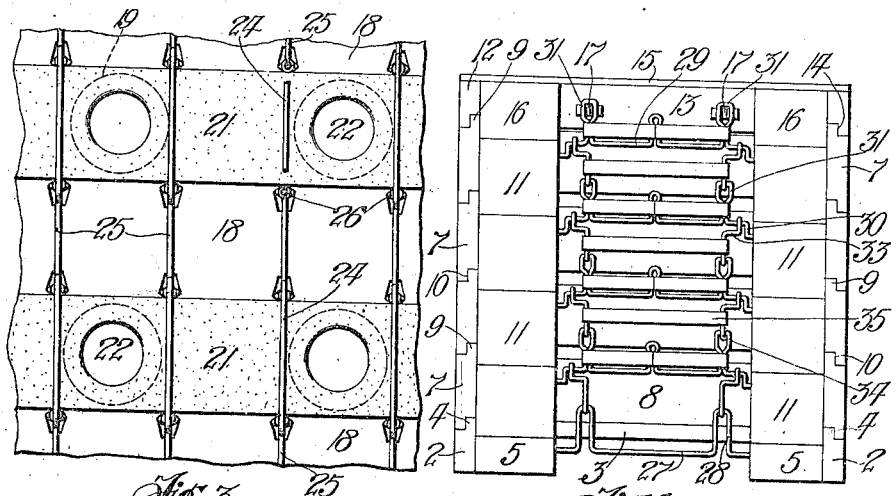
Fig. 3 is an enlarged plan of portion of an egg carrying tray.
Fig. 4 is a reduced end view showing a number of tray sections locked between a bottom section and a cover section.
Figure 5:
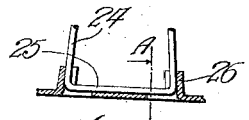
Fig. 5 is an enlarged detail view showing the attachment of a wire egg holder to a tray.
Figure 6:
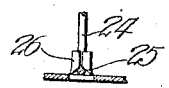
Fig. 6 is a section on line A of Fig. 5.

A box is assembled as follows:—The bottom section is placed on the ground or other support. A tray section is then placed upon the bottom section, the upstanding lips 4 of the said bottom section engaging the grooves 10 of the tray section. The crank wires 29 of the tray section are then pressed downwardly. The hooks 34 engage the cranked portions 28 of the crank wire of the bottom section. The eyelets of the crank wires of the tray section are then pressed upwardly securely fastening the two sections together. Any number of tray sections may then be placed upon the top of the first tray section, the upstanding lips 9 of each section engaging the grooves 10 of the section above, and the hooks 34 of the fastening links engaging the eyelets of the crank wire below. When the desired number of tray sections has been assembled the cover section is placed upon the uppermost of them, its grooves 14 accommodating the upstanding lip of the top tray section. The eyelets 31 of the uppermost tray section are then pressed upwardly and pass over the locking loops 17. A suitable seal or padlock is then passed through each of the locking loops and the whole box is securely locked together. A preferred form of seal is shown at 36 in Fig. 2 of the drawings and consists of a pin of lead or other soft metal which is passed through the locking loop, its ends being then pressed over by means of pliers or the like.

It will be obvious that the invention may be used for the transportation of fruit and the like and it is desired that the term eggs used in this specification is to be interpreted to include fruit and the like.

Having now described my invention, what I claim as new and desire to secure by Letters Patent is:—

1. In a box for the transportation of eggs, a bottom section and a cover section, a plurality of superimposed tray sections disposed between and interengaging with said bottom and cover sections, cushions disposed between each of the tray sections and the section below, crank wires carried by the tray sections, fastening links carried by the crank wires, said fastening links being adapted to engage the crank wires of the adjacent section and means carried by the cover section for locking all of the sections together.

2. In a box for the transportation of eggs, a bottom section, lips upstanding from the sides of the bottom section, a tray section, having grooves in the sides thereof, said grooves being engaged by the upstanding lips of the bottom section, lips upstanding from the sides of the tray section, a cover section having grooves, said grooves being engaged by the upstanding lips of the tray section, crank wires disposed at the ends of the bottom and tray sections, eyelets in the crank wires of the tray section, fastening links pivoted to the crank wires of the tray section and locking loops carried by the cover section and engaged by the eyelets of the tray section.

3. In a box for the transportation of eggs, a bottom section, lips upstanding from the sides of the bottom section, a tray section, having grooves in the sides thereof, said grooves being engaged by the upstanding lips of the bottom section, lips upstanding from the sides of the tray sections, a cover section, having grooves, said grooves being engaged by the upstanding lips of the tray section, crank wires disposed at the ends of the bottom and tray sections, fastening links pivoted to the crank wires of the tray section and means carried by the cover section for locking all of the sections together.

4. In a box for the transportation of eggs, a bottom section, lips upstanding from the sides of the bottom section, a plurality of superimposed tray sections above the bottom section, said tray sections having grooves in the sides thereof, lips upstanding from the sides of the tray sections, a cover section, having grooves, said grooves being engaged by the upstanding lips of the top tray section, crank wires mounted at the ends of the tray sections, eyelets formed in said crank wires, fastening links pivoted to said crank wires, connecting plates between said links, hooks on said links, said hooks engaging the eyelets of the adjacent crank wires, crank wires mounted at the ends of the bottom section and engaged by the hooks of the lowest tray section, locking loops on the cover being engaged by the eyelets of the top tray section, and a lock or seal engaging each of the locking loops.

5. In a box for the transportation of eggs, a bottom section and a cover section, a plurality of superimposed tray sections disposed between and interengaging with said bottom and cover sections, crank wires carried by the tray sections, fastening links carried by the crank wires, said fastening links being adapted to engage the crank wires of the adjacent section, and means carried by the cover section for locking all of the sections together.

In testimony whereof I affix my signature.

HERBERT GREGG.

Copies of this patent may be obtained for five cents each, by addressing the "Commissioner of Patents, Washington, D. C."